(12) United States Patent  
Yuen et al.

(10) Patent No.: US 10,978,771 B2  
(45) Date of Patent: Apr. 13, 2021

(54) LUMPED CIRCUIT BALANCE CONVERTER APPLIED TO DOUBLE-SIDED PARALLEL LINES

(71) Applicant: Innovation Sound Technology Co., Ltd., Guangdong (CN)

(72) Inventors: Shun Ming Yuen, Guangdong (CN); Wai Yin Mung, Guangdong (CN); Ka Ming Wu, Guangdong (CN)

(73) Assignee: Innovation Sound Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/568,244

(22) Filed: Sep. 11, 2019

(65) Prior Publication Data

US 2020/0076041 A1    Mar. 5, 2020

Related U.S. Application Data

(63) Continuation-in-part of application No. PCT/CN2018/104164, filed on Sep. 5, 2018.

(30) Foreign Application Priority Data

Aug. 31, 2018   (CN) .......................... 201811014293.3

(51) Int. Cl.  
*H01P 5/10* (2006.01)  
*H04B 1/40* (2015.01)  
*H01P 1/20* (2006.01)

(52) U.S. Cl.  
CPC ................ *H01P 5/10* (2013.01); *H01P 1/20* (2013.01); *H04B 1/40* (2013.01)

(58) Field of Classification Search  
CPC ................ H01P 5/10; H01P 1/20; H04B 1/40  
USPC .............................................................. 333/4  
See application file for complete search history.

(56) References Cited

U.S. PATENT DOCUMENTS

| 7,495,525 B2* | 2/2009 | Ilkov ................... H01F 17/0013 |
| | | 333/26 |
| 7,710,216 B2* | 5/2010 | Hamada .................... H01P 5/10 |
| | | 333/26 |
| 9,130,252 B2* | 9/2015 | Isom ......................... H01P 5/10 |
| 2012/0019333 A1* | 1/2012 | White ....................... H01P 5/12 |
| | | 333/26 |

(Continued)

FOREIGN PATENT DOCUMENTS

CN            104022322 A         9/2014

*Primary Examiner* — Robert J Pascal  
*Assistant Examiner* — Kimberly E Glenn

(57) ABSTRACT

The present invention discloses a lumped circuit balance converter applied to double-sided parallel lines, comprising a radio frequency transceiver, a balance converter, a filter and a matching network. The filter is connected with the matching network through the balance transmission line. The balance converter comprises a second circuit block, a first circuit block, a third circuit block, a first port, a second port and a third port. A positive polarity of a signal is positioned at the top of the second port and the bottom of the third port. Balance signals are respectively fed to the converter at the top of the second port and the bottom of the third port, and the signals are combined in the first port. The present invention has simple structure and better effect when used, can be easily changed to different required performance, and has good applicability and strong practicability.

7 Claims, 1 Drawing Sheet

(56) References Cited

U.S. PATENT DOCUMENTS

2018/0278240 A1* 9/2018 Visser ................... H01Q 7/00

* cited by examiner

LUMPED CIRCUIT BALANCE CONVERTER APPLIED TO DOUBLE-SIDED PARALLEL LINES

CROSS REFERENCE TO RELATED APPLICATIONS

The present application is a Continuation-In-Part Application of PCT Application No. PCT/CN2018/104164 filed on Sep. 5, 2018, which claims the benefit of Chinese Patent Application No. 201811014293.3 filed on Aug. 31, 2018. All the above are hereby incorporated by reference.

TECHNICAL FIELD

The present invention relates to a lumped circuit balance converter applied to double-sided parallel lines, and belongs to the technical field of circuits.

BACKGROUND

A balance-unbalance converter is an essential basic device for signal transmission matching between two different transmission media. Balance line means two conductors of the same type, each of which has the same characteristics impedance and length and signals in each side are in different phase. Unbalance line means that one side of conductor is grounded and the other side transmits signals. However, the existing balance-unbalance converter has poor effect when used, and thus cannot meet the needs of people. Therefore, there is an urgent need for improvement.

SUMMARY

To solve the technical problems to overcome the existing defects, the present invention provides a lumped circuit balance converter applied to double-sided parallel lines, which has simple structure and better effect when used, can be easily changed to different required performance, and has good applicability and strong practicability, thereby effectively solving the problems in the background.

To solve the above technical problems, the present invention provides the following technical solution:

The present invention provides a lumped circuit balance converter applied to double-sided parallel lines, comprising a radio frequency transceiver, a balance converter, a filter and a matching network. The radio frequency transceiver is connected with the balance converter through a balance transmission line. The balance converter is connected with the filter through the balance transmission line. The filter is connected with the matching network through the balance transmission line. The balance converter comprises a second circuit block, a first circuit block, a third circuit block, a first port, a second port and a third port. A positive polarity of a signal is positioned at the top of the second port and the bottom of the third port. Balance signals are respectively fed to the converter at the top of the second port and the bottom of the third port, and the signals are combined in the first port.

As a preferred technical solution of the present invention, the top and the bottom of the first circuit block respectively have a group of circuits which are parallel mutually.

As a preferred technical solution of the present invention, the top and the bottom of the second line respectively have a group of circuits which are parallel mutually.

As a preferred technical solution of the present invention, the top and the bottom of the third line respectively have a group of circuits which are parallel mutually.

As a preferred technical solution of the present invention, the balance transmission line is composed of two conductors of the same type, and each conductor has the same characteristic impedance and length.

As a preferred technical solution of the present invention, the balance transmission line is composed of two electronic parts of the same type.

The present invention achieves the beneficial effects: the present invention has simple structure and better effect when used, can be easily changed to different required performance, and has good applicability and strong practicability.

DESCRIPTION OF DRAWINGS

The drawings are used to provide further understanding for the present invention and constitute part of the description. The drawings are used to explain the present invention together with the embodiments of the present invention, and do not constitute a limitation to the present invention.

In the figures.

Numerals in the figures: 1 second circuit block; 2 first circuit block; 3 third circuit block; 4 first port; 5 second port; 6 third port; 7 radio frequency transceiver; 8 balance converter; 9 filter; and 10 matching network.

DETAILED DESCRIPTION

Preferred embodiments of the present invention will be explained below in detail in combination with drawings. It should be understood that the preferred embodiments described below are only used for describing and explaining the present invention, but are not used for limiting the present invention.

Figure 1:
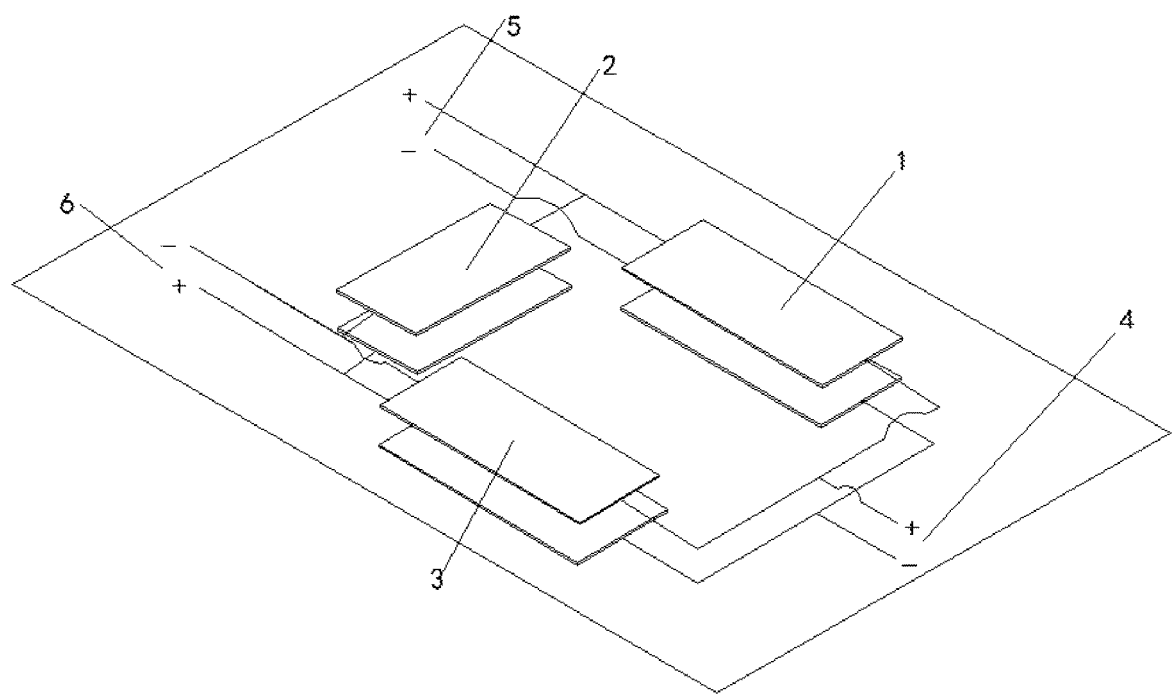
FIG. 1 is a schematic diagram of a lumped circuit balance converter applied to double-sided parallel lines in embodiments of the present invention.
Figure 2:
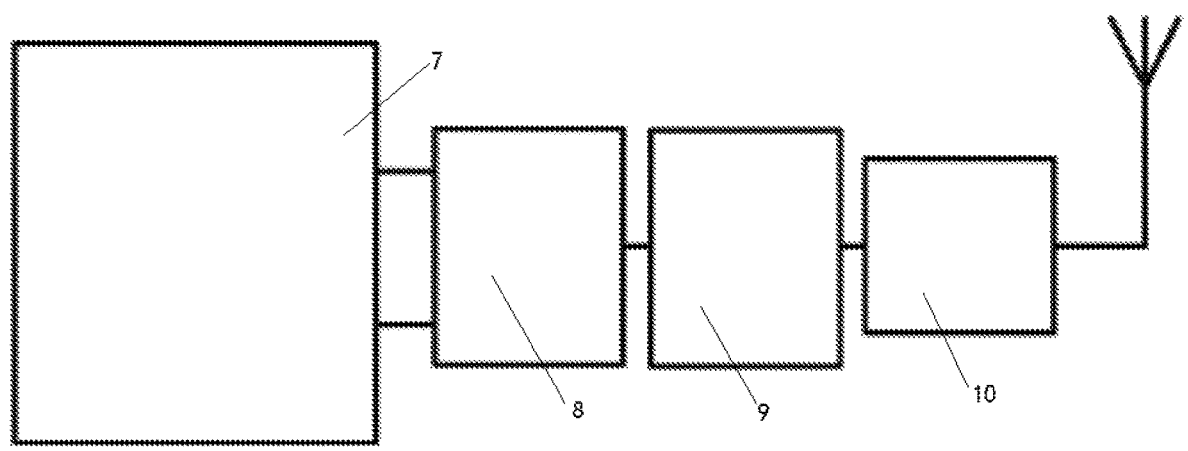
FIG. 2 is a schematic diagram for conversion between a balance transmission line and an unbalance transmission line.

Embodiment: with reference to FIGS. 1-2, the present invention provides a lumped circuit balance converter applied to double-sided parallel lines, comprising a radio frequency transceiver 7, a balance converter 8, a filter 9 and a matching network 10. The radio frequency transceiver 7 is connected with the balance converter 8 through a balance transmission line. The balance converter 8 is connected with the filter 9 through the balance transmission line. The filter 9 is connected with the matching network 10 through the balance transmission line. The balance converter 8 comprises a second circuit block 1, a first circuit block 2, a third circuit block 3, a first port 4, a second port 5 and a third port 6. A positive polarity of a signal is positioned at the top of the second port 5 and the bottom of the third port 6. Balance signals are respectively fed to the converter at the top of the second port 5 and the bottom of the third port 6, and the signals are combined in the first port 4.

Further, the top and the bottom of the first circuit block 2 respectively have a group of lines which are parallel mutually.

Further, the top and the bottom of the second circuit block 1 respectively have a group of lines which are parallel mutually.

Further, the top and the bottom of the third circuit block 3 respectively have a group of lines which are parallel mutually.

Further, the balance transmission line is composed of two conductors of the same type, and each conductor has the same characteristic impedance and length.

Further, the balance transmission line is composed of two electronic parts of the same type.

It should be noted that, the present invention provides a lumped circuit balance converter applied to double-sided parallel lines, which has simple structure and better effect when used, can be easily changed to different required performance, and has good applicability and strong practicability.

Finally, it should be noted that the above description is only a preferred embodiment of the present invention, and is not intended to limit the present invention. Although the present invention is described in detail with reference to the above embodiment, those skilled in the art may still modify the technical solution recorded in the above embodiment, or equivalently replace some of the technical features. Any modification, equivalent replacement, improvement, etc. made within the spirit and the principle of the present invention shall be included within the protection scope of the present invention.

What is claimed is:

1. A lumped circuit balance converter applied to double-sided parallel lines, comprising a radio frequency transceiver (7), a balance converter (8), a filter (9) and a matching network (10), characterized in that the radio frequency transceiver (7) is connected with the balance converter (8) through a balance transmission line; the balance converter (8) is connected with the filter (9) through a balance transmission line; the filter (9) is connected with the matching network (10) through a balance transmission line; the balance converter (8) comprises a second circuit block (1), a first circuit block (2), a third circuit block (3), a first port (4), a second port (5) and a third port (6); a positive polarity of a signal is positioned at top of the second port (5) and bottom of the third port (6); balance signals are respectively fed to the converter at the top of the second port (5) and the bottom of the third port (6), and the signals are combined in the first port (4).

2. The lumped circuit balance converter applied to double-sided parallel lines according to claim 1, characterized in that the and bottom of the first circuit block (2) respectively have a group of lines which are parallel mutually.

3. The lumped circuit balance converter applied to double-sided parallel lines according to claim 1, characterized in that top and bottom of the second circuit block (1) respectively have a group of lines which are parallel mutually.

4. The lumped circuit balance converter applied to double-sided parallel lines according to claim 1, characterized in that top and bottom of the third circuit block (3) respectively have a group of lines which are parallel mutually.

5. The lumped circuit balance converter applied to double-sided parallel lines according to claim 1, characterized in that the filter (9) is a band pass filter.

6. The lumped circuit balance converter applied to double-sided parallel lines according to claim 1, characterized in that the balance transmission line is composed of two conductors of the same type, and each conductor of the two conductors has the same characteristic impedance and length.

7. The lumped circuit balance converter applied to double-sided parallel lines according to claim 1, characterized in that the balance transmission line is composed of two electronic parts of the same type.

* * * * *